United States Patent
Kim

(10) Patent No.: US 12,143,030 B2
(45) Date of Patent: Nov. 12, 2024

(54) RESTART OF AN AC-TO-DC CONVERTER UPON A TEMPORARY DROP-OUT OF AN AC VOLTAGE

(71) Applicant: TEXAS INSTRUMENTS INCORPORATED, Dallas, TX (US)

(72) Inventor: Jongwan Kim, Katy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 173 days.

(21) Appl. No.: 17/702,511

(22) Filed: Mar. 23, 2022

(65) Prior Publication Data

US 2022/0311351 A1 Sep. 29, 2022

Related U.S. Application Data

(60) Provisional application No. 63/164,885, filed on Mar. 23, 2021.

(51) Int. Cl.
*H02M 7/219* (2006.01)
*H02M 1/32* (2007.01)
*H02M 1/42* (2007.01)

(52) U.S. Cl.
CPC ........... *H02M 7/219* (2013.01); *H02M 1/325* (2021.05); *H02M 1/4233* (2013.01)

(58) Field of Classification Search
CPC ...... H02M 1/325; H02M 7/217; H02M 7/219; H02M 7/2195; H02M 1/32; H02M 1/42; H02M 1/4233; H02M 1/4208; H02M 1/0025
See application file for complete search history.

(56) References Cited

U.S. PATENT DOCUMENTS

| | | | | |
|---|---|---|---|---|
| 7,391,218 B2* | 6/2008 | Kojori | ............... | H02H 1/0015 324/520 |
| 8,729,729 B2* | 5/2014 | Fridberg | ............... | H02J 1/14 315/307 |
| 2011/0080104 A1* | 4/2011 | Gray | ............... | H05B 41/40 315/246 |
| 2014/0001871 A1* | 1/2014 | Vogman | ............... | H02J 5/00 307/82 |
| 2014/0119084 A1* | 5/2014 | Ashikaga | ............... | H02M 1/32 363/126 |
| 2014/0368741 A1* | 12/2014 | Joo | ............... | H02M 1/32 348/730 |
| 2016/0336871 A1* | 11/2016 | Aungurencei | ............... | H02M 7/217 |
| 2017/0023621 A1* | 1/2017 | Tasevski | ............... | G01R 19/04 |

(Continued)

*Primary Examiner* — Gustavo A Rosario-Benitez
(74) *Attorney, Agent, or Firm* — Michael T. Gabrik; Frank D. Cimino

(57) ABSTRACT

A method of converting an alternating current (AC) voltage to a direct current (DC) voltage by an AC-to-DC converter. The method includes producing an AC virtual waveform approximately synchronized to the AC voltage. The method further includes detecting a cessation of the AC voltage, continuing to produce the AC virtual waveform during the cessation of the AC voltage, and detecting a resumption of the AC voltage. Upon detecting the resumption of the AC voltage, the method includes applying the AC virtual waveform to a control loop implemented by the AC-to-DC converter for a period of time, and after the period of time, the method includes applying an output of a phase-locked loop to the control loop instead of the AC virtual waveform.

19 Claims, 6 Drawing Sheets

(56) References Cited

U.S. PATENT DOCUMENTS

| | | | |
|---|---|---|---|
| 2017/0130699 A1* | 5/2017 | Achilles | G05B 13/0205 |
| 2018/0019656 A1* | 1/2018 | Matsuda | H02M 3/33523 |
| 2018/0097365 A1* | 4/2018 | Adamczyk | H02J 3/40 |
| 2019/0097527 A1* | 3/2019 | Bhardwaj | H02M 1/44 |
| 2019/0097529 A1* | 3/2019 | Bhardwaj | H02M 1/4233 |
| 2021/0135597 A1* | 5/2021 | Hario | H02M 7/48 |
| 2022/0190741 A1* | 6/2022 | Katoh | H02M 7/5395 |
| 2023/0147142 A1* | 5/2023 | Kono | H02J 3/36 |
| | | | 307/82 |

* cited by examiner

RESTART OF AN AC-TO-DC CONVERTER UPON A TEMPORARY DROP-OUT OF AN AC VOLTAGE

CROSS-REFERENCE TO RELATED APPLICATIONS

This application claims priority to U.S. Provisional Application No. 63/164,885, filed Mar. 23, 2021, which is hereby incorporated by reference.

BACKGROUND

The power grid typically provides an alternating current (AC)-based voltage to the end-user. End-user equipment, however, often operates on direct current (DC) voltage, not AC voltage. An AC-to-DC voltage converter is included which converts an AC voltage (e.g., from the grid) to a DC voltage.

Power factor is conventionally expressed as the ratio between active power and apparent power consumed by an electrical device. Power factor is a measure of how much electrical power is converted into useful work power. An ideal power factor is 1 in which 100% of the input power is converted into useful power. Typically, however, the power factor for a given load is less than 1 (e.g., 0.7, 0.8, 0.9, etc.). For a power factor of, for example, 0.8, only 80% of the input power is supplied to the load and the other 20% is returned to the source.

In some conditions, the AC current through the converter may be out-of-phase with respect to the AC voltage. For example, an inductive bad may cause the AC current to lag the AC voltage. This phase difference between current and voltage results in a power factor of less than 1. A power factor correction circuit may be included to increase the power factor closer to 1. Most AC-to-DC converters include power factor correction as part of their design to meet applicable regulations or standards.

SUMMARY

In one example, a method of converting an alternating current (AC) voltage to a direct current (DC) voltage by an AC-to-DC converter. The method includes producing an AC virtual waveform approximately synchronized to the AC voltage. The method further includes detecting a cessation of the AC voltage, continuing to produce the AC virtual waveform during the cessation of the AC voltage, and detecting a resumption of the AC voltage. Upon detecting the resumption of the AC voltage, the method includes applying the AC virtual waveform to a control loop implemented by the AC-to-DC converter for a period of time, and after the period of time, the method includes applying an output of a phase-locked loop to the control loop instead of the AC virtual waveform.

In another example, a non-transitory storage device contains software that, when executed by a processor, causes the processor to produce an AC virtual waveform approximately synchronized to the AC voltage, detect a cessation of the AC voltage, continue to produce the AC virtual waveform during the cessation of the AC voltage, and detect a resumption of the AC voltage. Upon detecting the resumption of the AC voltage, the software causes the processor to apply the AC virtual waveform to a control loop implemented by the AC-to-DC converter for a period of time, and after the period of time, apply an output of a phase-locked loop to the control loop instead of the AC virtual waveform.

In yet another example, a control unit is adapted to be coupled to an alternating current (AC)-to-direct current (DC) voltage converter The control unit includes a non-transitory storage device containing software. A processor is coupled to the non-transitory storage device. The processor is configured to execute the software contained in the non-transitory storage unit. Upon executing the software, the processor is configured to produce an AC virtual waveform approximately synchronized to the AC voltage, detect a cessation of the AC voltage, continue to produce the AC virtual waveform during the cessation of the AC voltage, and detect a resumption of the AC voltage. Upon detecting the resumption of the AC voltage, the processor is configured to apply the AC virtual waveform to a control loop implemented by the AC-to-DC converter for a period of time, and after the period of time, apply an output of a phase-locked loop to the control loop instead of the AC virtual waveform

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

Figure 1:
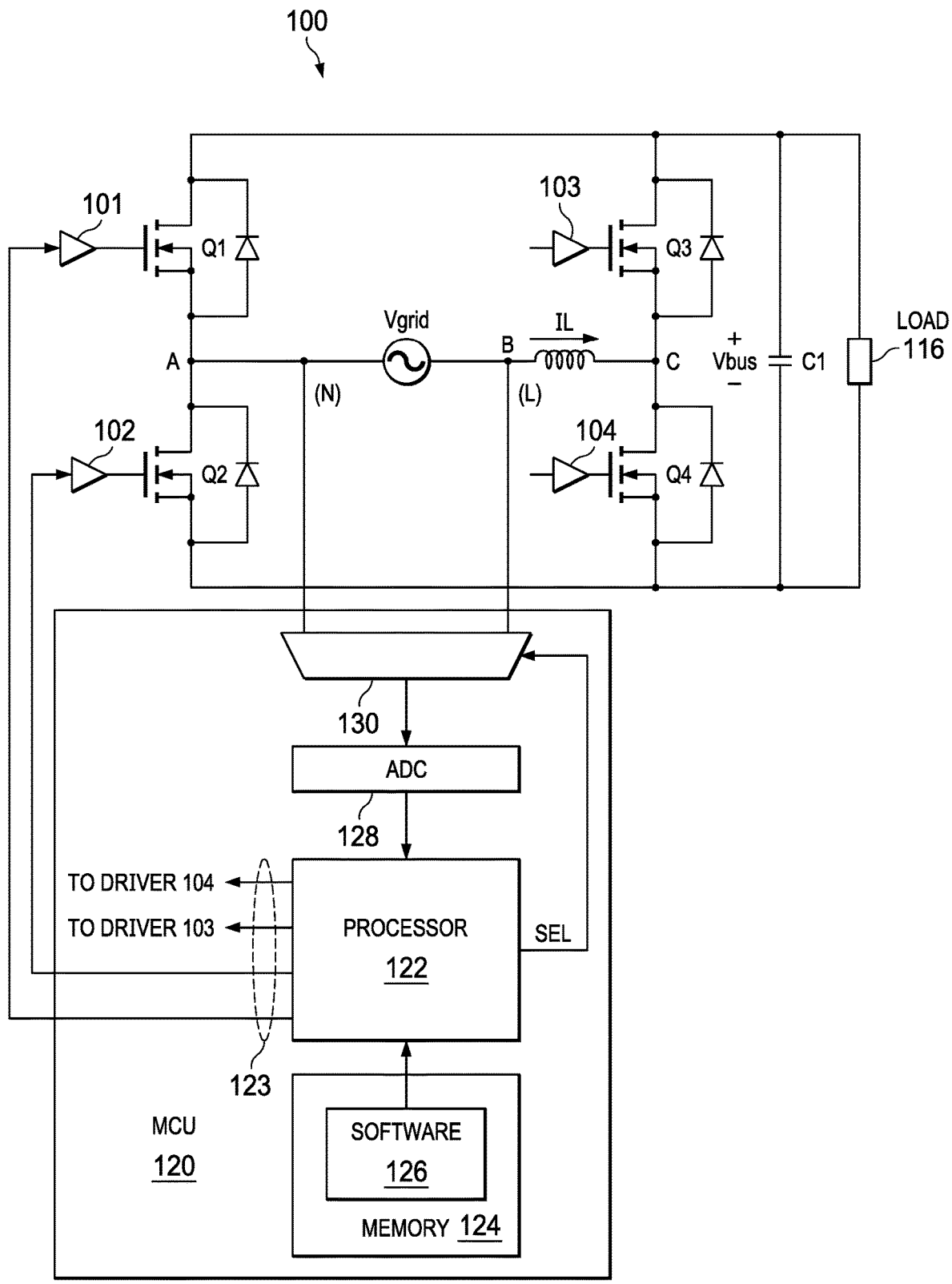
FIG. 1 is an AC-to-DC converter with power factor correction, in accordance with an example.

FIG. 1 is a schematic of an AC-to-DC converter 100 in accordance with an example embodiment. The AC-to-DC converter 100 includes transistors Q1, Q2, Q3, and Q4, an inductor L1, a capacitor C1, and a microcontroller unit (MCU) 120. The components of the AC-to-DC converter 100 shown in FIG. 1 may be fabricated on the same integrated circuit (IC), or one or more of the components may be provided "off-chip."

In this example, each of transistors Q1-Q4 are N-channel metal oxide semiconductor field effect transistors (NFETs). The source of transistor Q1 is coupled to the drain of transistor Q2 at a node labeled "A." The source of transistor Q3 is coupled to the drain of transistor Q4 at a node labeled "C." One terminal of inductor L1 is coupled to node C and the other terminal of inductor L1 is couple to node "B." The AC grid voltage input to the AC-to-DC converter 100 is coupled to nodes A and B. The AC grid voltage is represented as "Line" (L) and "Neutral" ("N"). The drains of transistors Q1 and Q3 are coupled together and to the upper plate of capacitor C1. The sources of transistors Q2 and Q4 are coupled together and to the lower plate of capacitor C1. The voltage across the capacitor is the DC output voltage (Vbus) of the converter. The current through the inductor L1 is current IL. A load 116 is shown coupled to the capacitor C1. The load may be an electrical device or system to be operated by the Vbus voltage. The load alternatively may be a DC-to-DC converter to convert the Vbus voltage to a different (e.g., lower) DC voltage for subsequent use by a down-stream load.

A gate driver 101, 102, 103, and 104 is provided for each of the respective transistors Q1-Q4. The output of gate driver 101 is coupled to the gate of transistor Q1. The output of gate driver 102 is coupled to the gate of transistor Q2. The output of gate driver 103 is coupled to the gate of transistor Q3. The output of gate driver 104 is coupled to the gate of transistor Q4. The MCU 120 includes a processor 122, memory 124, an analog-to-digital converter (ADC) 128, and an analog multiplexer 130. The memory 124 is a non-transitory storage device which may be implemented as volatile memory (e.g., random-access memory) or non-volatile memory (e.g., read-only memory). The processor 122, which may be a central processing unit (CPU) core, executes software 126 stored in memory 124 to determine, among other things, when to turn on and off each of the transistors Q1-Q4. Output control signals 123 generated by the processor 122 are provided to the various gate drivers 101-104 as shown. In one example, a logic high assertion of a control signal 123 causes the respective gate driver 101-104 to generate a high enough voltage on the gate of the respective transistor to thereby turn "ON" the transistor.

One input of multiplexer is coupled to node A (AC grid neutral), and the other input of multiplexer is coupled to node B (AC grid line). A selection signal (SEL) provided by the processor 122 to a selection input of the multiplexer controls which of the analog Line or Neutral voltages is provided to an input of the ADC 128. The ADC 128 samples and converts the selected AC grid Line or Neutral voltage to a digital value which is provided to the processor 122 for use as described below. The sampled AC grid voltage (sampled voltage difference between Line and Neutral) is referred to herein as the AC sensed voltage. In one example, the AC grid voltage is a 50 Hz or 60 Hz sinusoidal voltage and the conversion rate of the ADC converter is ten times the grid frequency (e.g., 500 samples/second or 600 samples/second), or higher (e.g., tens of thousands of samples/second).

Upon executing software 126, the processor 122 implements a voltage control loop (an example of which is shown and described below with reference to FIG. 4). The processor 122 implements the voltage control loop to determine when to turn on and off the transistors Q1-Q4 in order to regulate the output voltage Vbus. The voltage control loop also includes a current control loop to control the current through the inductor to be approximately in phase with the AC grid voltage. The processor 122 also implements (via software 126) a software phase-locked loop (SPLL). The SPLL uses a representation of the AC grid voltage (e.g., the AC sensed voltage) generated from the AC sensed voltage as a reference waveform to generate a normalized output AC waveform (sinusoidal) that is phase-locked to the AC grid voltage (e.g., in phase with the AC grid voltage). The output AC waveform from the SPLL is applied to the voltage control loop and the current control loop to help the loops maintain the inductor current IL approximately in phase with the AC grid voltage.

Figure 2:
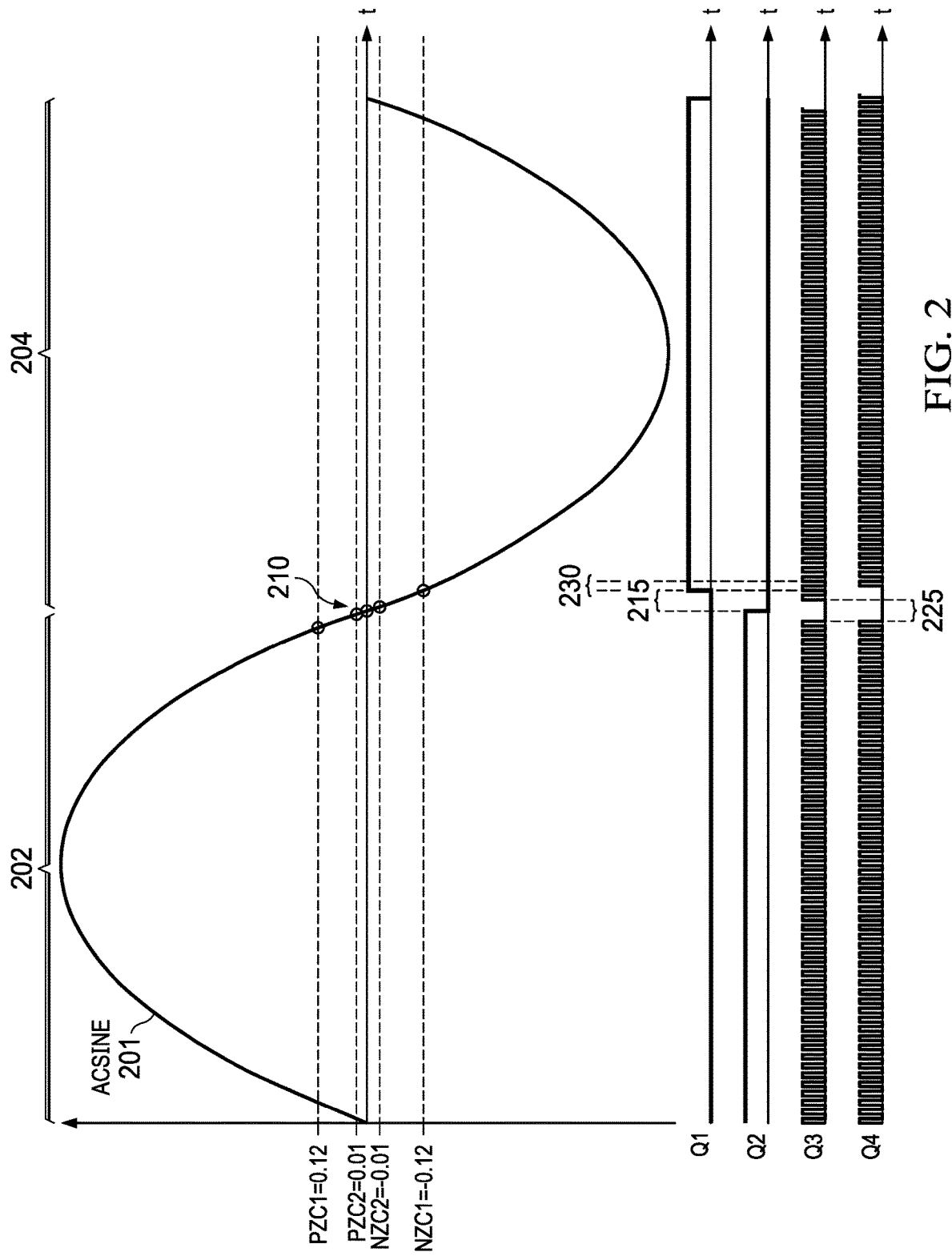
FIG. 2 is a timing diagram illustrating the operation of switches within the AC-to-DC converter of FIG. 1, in accordance with an example.

FIG. 2 includes an example cycle of the SPLL output waveform 201. As a sinusoidal waveform, the waveform has a positive half-cycle 202 and a negative half-cycle 204. The SPLL waveform is used by the processor 120 to determine when to turn on and off transistors Q1 and Q2 and to implement a dead time with respect to transistors Q3 and Q4. For example, the voltage control loop noted above (and described below) is used to control the duty cycle of transistors Q3 and Q4 to maintain the output voltage Vbus at the target level. The processor 120 responds to the positive half-cycle 202 of the SPLL waveform 201 by turning "ON" transistor Q2 and turning "OFF" transistor Q1. Based on the voltage control loop, the processor turns transistors Q3 and Q4 reciprocally "ON" and "OFF" at frequency substantially higher than the frequency of the AC grid voltage and at a controlled duty cycle to maintain the output voltage Vbus at the target regulated level. When Q3 is on, Q4 is off, and when Q4 is on, Q3 is off. The same high frequency switching behavior of Q3 and Q4 also occurs during the negative half-cycle 204 of the AC grid voltage.

Near the zero-crossing point 201, the processor 120 implements a dead-time 215. At the beginning of dead-time 215, the processor 120 turns off transistor Q2 at which point transistors Q1 and Q2 are both off. At the end of the dead-time 215, the processor 120 turns on transistor Q1. Further, near the zero-crossing point 210, the processor 120 turns off transistors Q3 and Q4 for the time period denoted as 225. The processor 120 then toggles transistor Q3 on and off at a lower frequency during a short period of time 230, and at the end of time period 230, the processor 120 reciprocally toggles on and off transistors Q3 and Q4 at the same higher rate as during the positive half-cycle 202 and also at a controlled duty cycle to regulate the output voltage level. A similar process is implemented near the subsequent zero-crossing point at which the negative half-cycle 204 transitions into the next positive half-cycle.

The processor 120 uses the SPLL's output sinusoidal signal (which is phase-locked to the AC grid voltage) as an input sinusoidal signal to the voltage control loop. An example of when the use of the SPLL's output sinusoidal signal may not be acceptable is when the AC grid voltage returns after a temporary drop-out to the AC-to-DC voltage converter 100. The drop-out of the AC grid voltage may be relatively short-lived (e.g., 10 milliseconds to 20 milliseconds). Such short duration drop-outs may be due, for example, to a grid fault from lightening. The AC voltage on the grid itself persists during the drop-out, and the drop-out only refers to a temporary decoupling between the grid voltage and the input to the AC-to-DC converter 100. During a drop-out of the AC grid voltage, the processor is unable to generate an AC sensed voltage as well. Because the AC sensed voltage is the reference signal to the SPLL, the SPLL loses its lock, and the frequency and/or phase of the SPLL sinusoidal output signal drifts away from the AC grid voltage.

Figure 3:
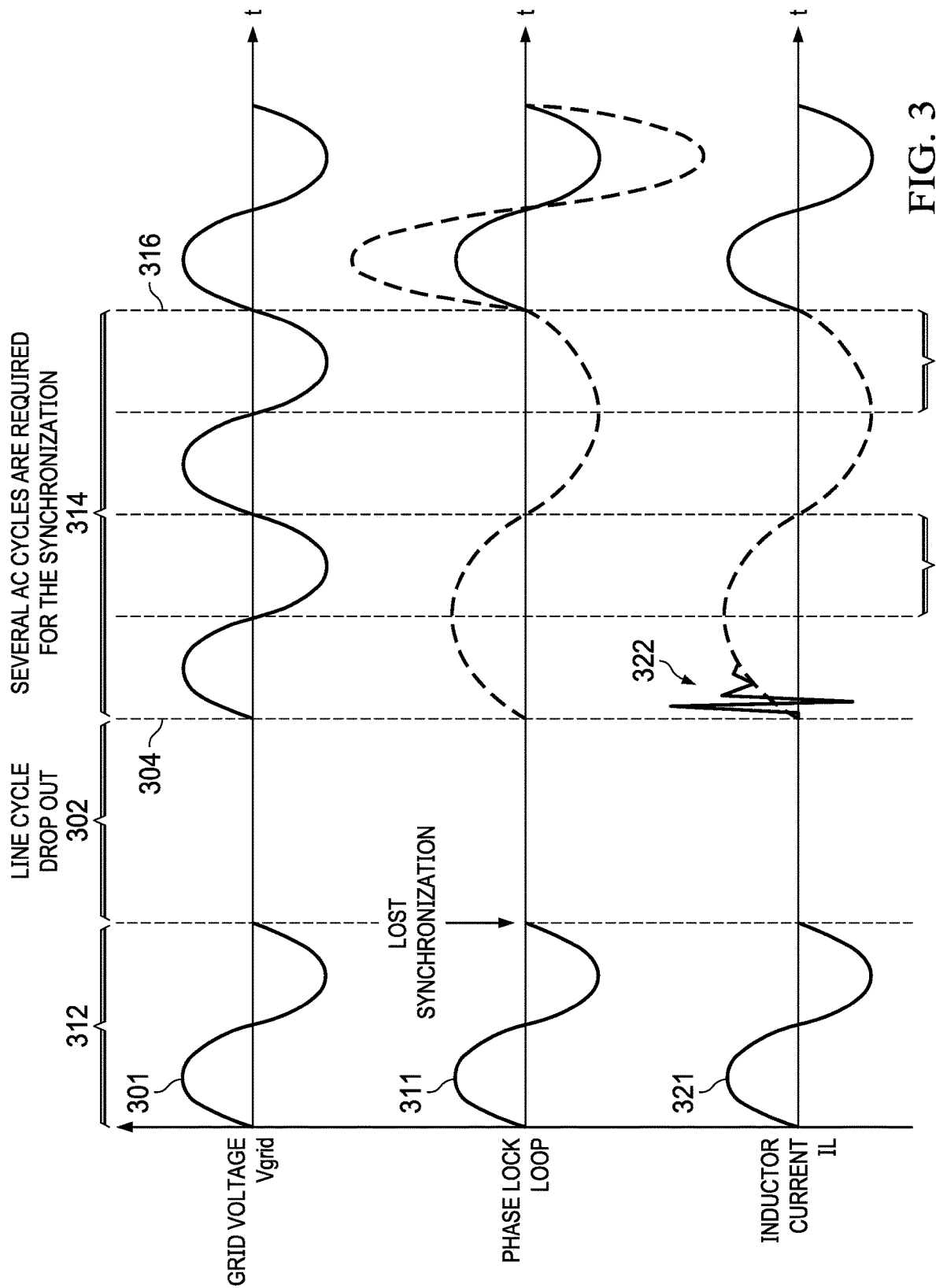
FIG. 3 are waveforms illustrating a problem that may occur upon a temporary cessation of the AC grid voltage to the AC-to-DC converter.

FIG. 3 provides waveforms 301, 302, and 303 that illustrate the temporary drop-out of the AC grid voltage. Waveform 301 is the grid voltage, which temporarily drops-out during time period 302. In this, example, the drop-out during time period 302 corresponds to one cycle of the sinusoidal AC grid voltage, but in general, the drop-out can be any arbitrary period of time (e.g., 5 microseconds to 100 milliseconds). Waveform 311 is the SPLL's output signal. Before the AC grid drop-out, the SPLL output signal is phase-locked to the AC grid voltage as shown at 312. However, when the AC grid voltage returns at 304, the SPLL output signal has a different (e.g., lower) frequency than the newly returned AC grid voltage, as shown at 314. It may take several cycles of the AC grid voltage for the SPLL to re-establish lock to the AC grid voltage. Eventually, at 316, the SPLL re-establishes the lock to the AC grid voltage. Waveform 321 represents the current through inductor L1. The use of the SPLL sinusoidal output signal during time period 314 (while it is not locked to the AC grid voltage) unfortunately may cause a distortion in the inductor current IL as shown at 322. Further, the inductor current is out-of-phase with respect to the AC grid voltage until the SPLL re-establishes its lock. The significant phase difference between the SPLL output signal during time period 314 and the AC grid voltage reduces the power factor during that time period rendering the AC-to-DC converter less efficient.

In accordance with the embodiments described below, upon executing software 126, the processor 120 generates a virtual AC waveform based on the AC sensed voltage separate from the SPLL output signal, and, upon a return of the AC grid voltage (following a drop-out), uses the virtual AC waveform for the control loop instead of the SPLL's output signal until the SPLL can re-establish a lock to the AC sensed voltage.

Figure 4:
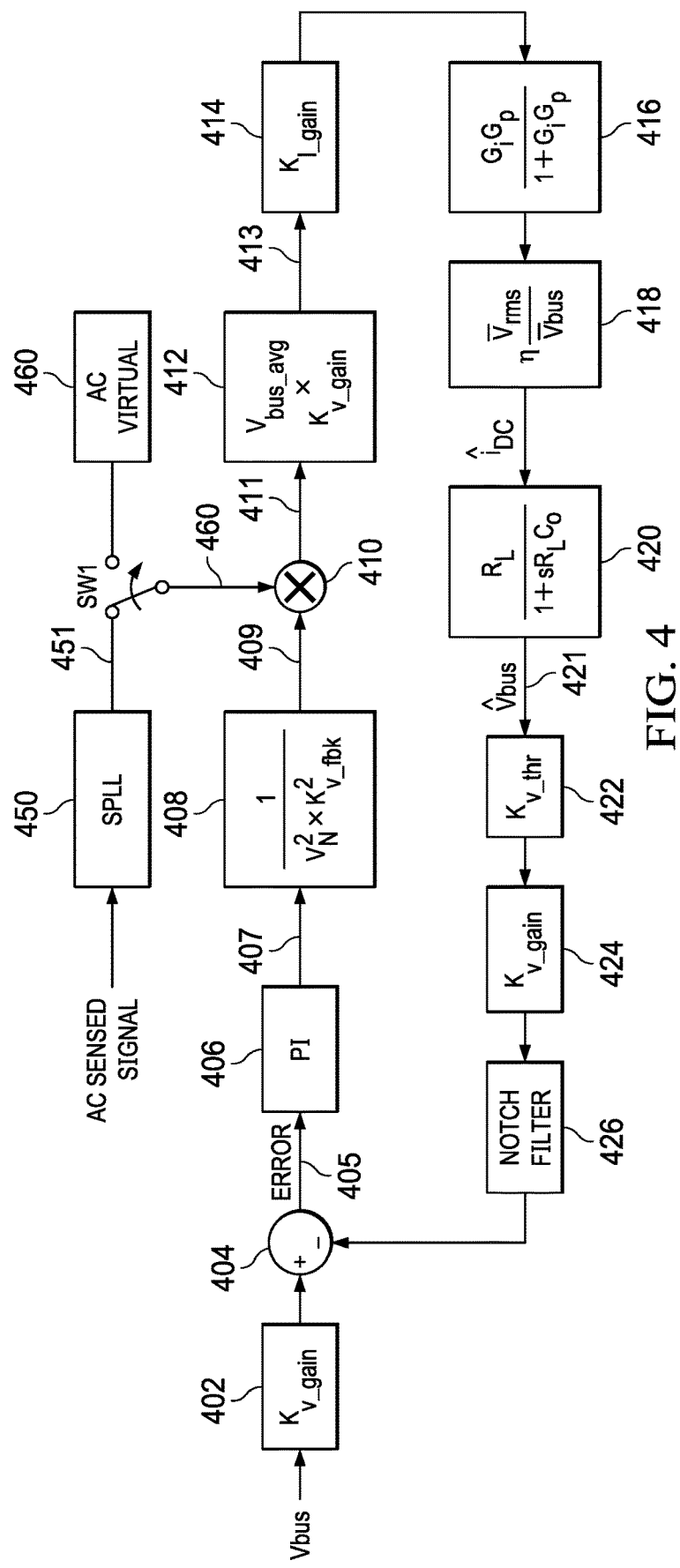
FIG. 4 is a model of a control loop implemented by the AC-to-DC converter of FIG. 1, in accordance with an example.

FIG. 4 is block diagram of the voltage control loop implemented by the processor 120 upon executing software 126. The voltage gain Kv_gain 402 normalizes the Vbus voltage. Subtractor 404 subtracts the senses Vbus voltage (sense Vbus voltage 421) from the normalized Vbus voltage to produce an error value 405 (ERROR). The error value 405 is provided to a proportional integrator (PI) compensator 406. To eliminate ripple and noise, additional filters 422 and 426 are used and gain stage 424 normalizes the sensed Vbus voltage 421. The PI compensator 406 generates a power reference value 407, which is then divided by the square of the normalized voltage to generate the conductance 409 (P=V^2/R, where conductance=1/R). Multiplier 410 multiplies the conductance by a normalized sinewave 460 to generate the instantaneous conductance 411. The instantaneous conductance 411 is then multiplied (block 412) by the normalized bus voltage to produce an output 413. Gain stage 414 then normalizes the resulting output 413 from block 412. Current compensator 416 regulates the inductor current (iL) to follow the sinusoidal reference. By taking in the efficiency of the system, the output of the current compensator is multiplied by the term in block 418 to calculate the DC bus current idc from the inductor current, iL. The DC bus current is then multiplied by transfer function 420 to generate the bus voltage 421.

Multiplier 410 includes an input that receives a sinewave 460 that is approximately in-phase with the AC grid voltage. An SPLL 450 locks on to the AC sensed voltage and provides an output signal 451. The processor 120 generates the AC virtual waveform 460. During the initialization of the MCU 120, SPLL provides the angular frequency (ω, radians per second) of the grid voltage and the phase angle (φ). The MCU 120 repeatedly evaluates Equation (1):

$$\text{AC Virtual waveform} = \sin(\omega t + \varphi) \quad (1)$$

to generate the AC virtual waveform. While the AC grid voltage is present, the MCU periodically (every 1 millisecond) obtains a value of the phase angle (φ) and uses the newly obtained phase angle in the equation above to generate new data values of the AC virtual waveform. In one example, the MCU increments time (t) in a software loop to generate the AC virtual waveform values. A software switch SW1 is controlled by the processor 120 to provide either the SPLL output signal 451 or the AC virtual waveform 460 to the multiplier 410 as signal 460 within the voltage control loop.

Figure 5:
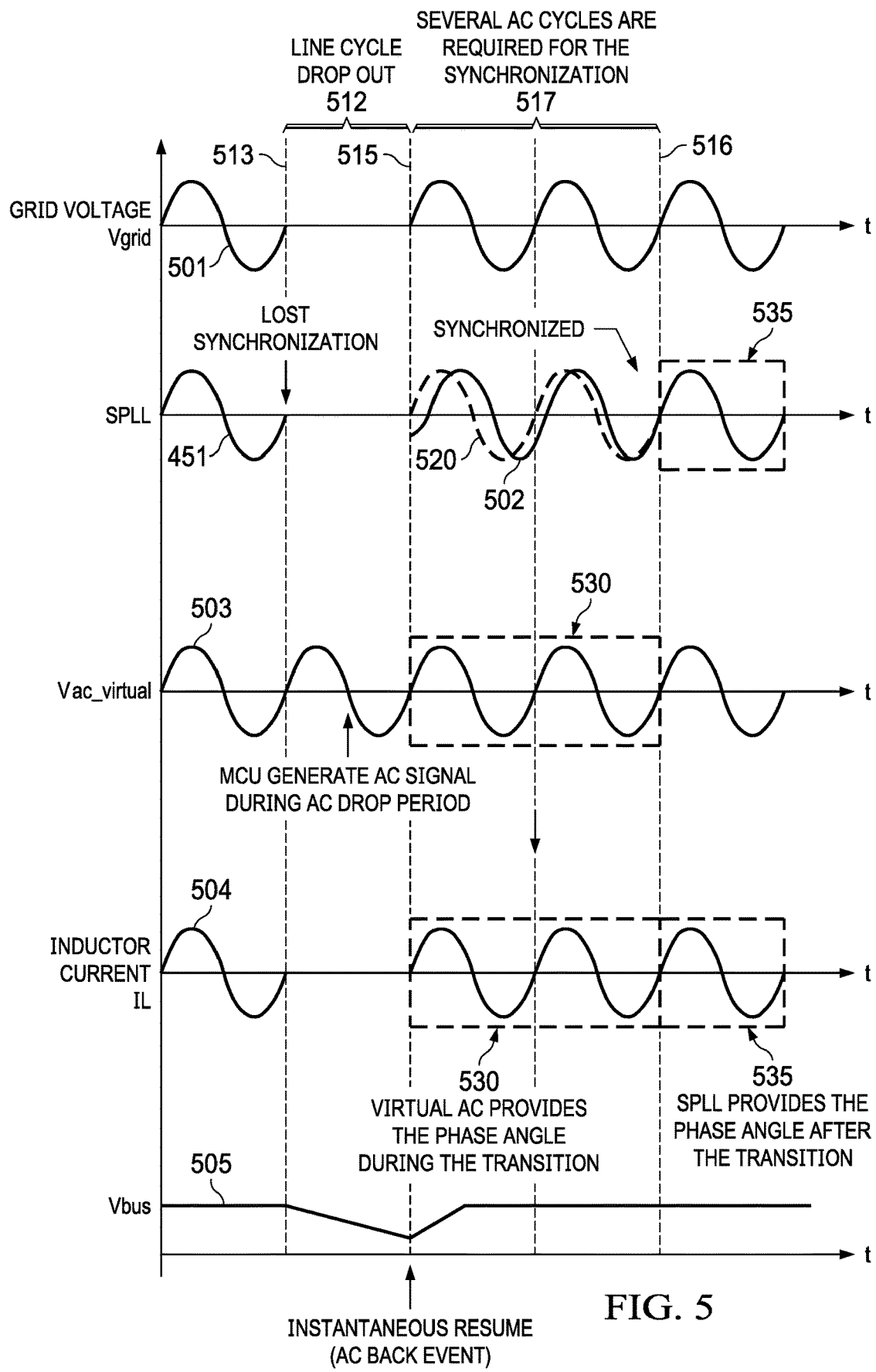
FIG. 5 are waveforms illustrating the operation of the AC-to-DC converter upon occurrence of a temporary drop-out of the AC grid voltage to the AC-to-DC converter.

FIG. 5 includes waveforms that illustrate the operation of the processor 120 upon return of the AC grid voltage following a temporary drop-out. The waveforms include the AC grid voltage 501, the SPLL output signal 451, the AC virtual waveform 503, the inductor current 504, and the converter's output voltage 505. The drop-out occurs at 513 and ends at 515. The time duration of the drop-out is time period 512. During the drop-out time period 512, the SPLL is unable to provide an output signal. The processor 120, however, continues to generate the virtual AC waveform 503 during the drop-out time period under the assumption that the AC grid voltage 501 will continue to have substantially the same frequency and phase throughout the drop-out time period. Accordingly, the virtual AC waveform 503 remains substantially phase-locked during the drop-out time period 512 to the AC grid voltage 501.

Upon resumption of the AC grid voltage at 515, the SPLL takes a time period 517 to re-establish the lock to the AC grid voltage. During that time period 517, the processor 120 uses the AC virtual waveform 530 as signal 460 to the voltage control loop. The processor 120 then reverts back to using the SPLL output signal 451 at 535 as the signal 460 to the voltage control loop instead of the AC virtual waveform. In one embodiment, the processor 120 applies the AC virtual waveform to the voltage control loop for a defined period of time deemed long enough to allow the SPLL to re-establish lock to the AC grid voltage. The time period (517 in the example of FIG. 5) may be determined, for example, through software simulation. Upon resumption of the AC grid voltage at 515, the processor 120 may initiate a timer (e.g., a hardware timer or a software timer). Before the timer expires, the processor 120 applies the AC virtual waveform to the voltage control loop. Upon expiration of the timer, the processor then applies the SPLL output signal 451 to the voltage control loop.

Waveform 505 shows what happens to the output voltage Vbus. During the drop-out period 512, the Vbus voltage decreases generally linearly as the capacitor C1 discharges to the load 116. Upon resumption of the AC grid voltage, the Vbus voltage increases until it again reaches its target, regulated level.

The processor 120 detects when an AC grid voltage drop-out has occurred and when the AC grid voltage returns. In one embodiment, the processor 120, upon executing software 126, compares the AC sensed voltage to the AC virtual waveform 460 multiple times per cycle. If the two voltages are the same or within a predetermined range of each other, the processor determines that the AC grid voltage is present. If the AC sensed voltage differs from the AC virtual waveform by more than a predetermined threshold, then the processor 120 determines that a grid voltage drop-out has occurred. Upon return of the AC grid voltage, upon the processor 120 again determining that the AC sensed voltage is approximately equal to the AC virtual waveform, the processor 120 determines that the drop-out has ended.

Figure 6:
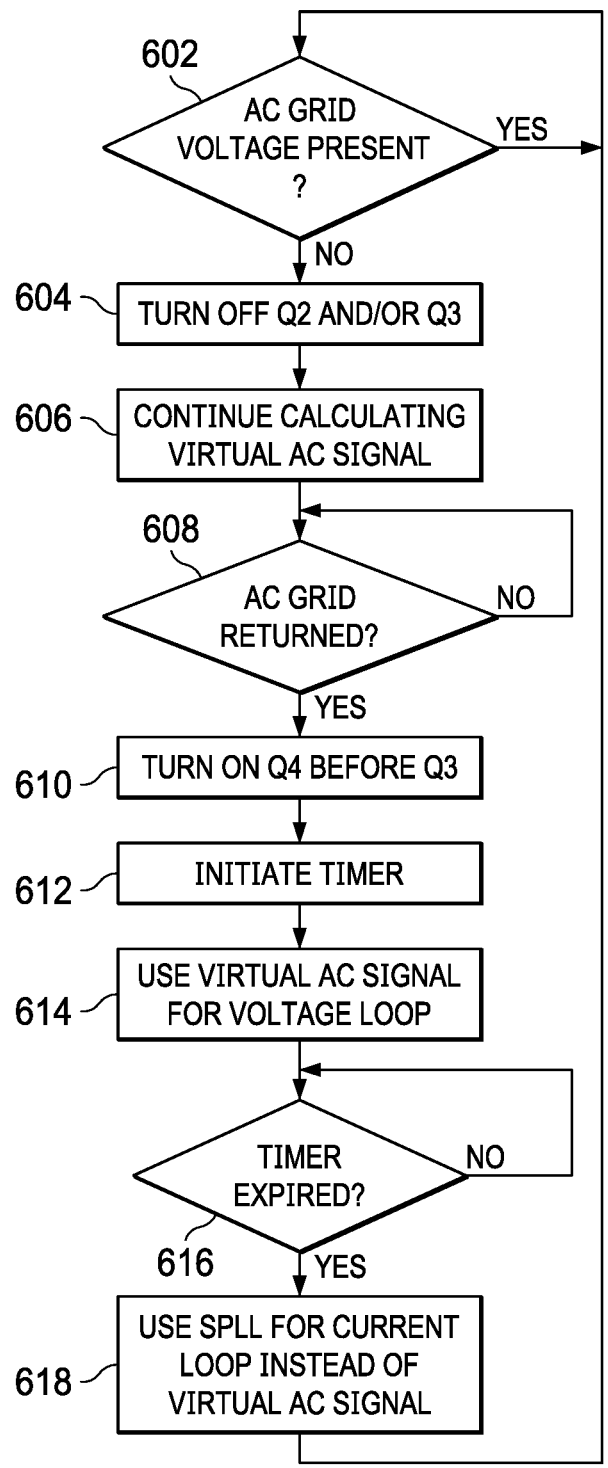
FIG. 6 are waveforms illustrating the operation of the AC-to-DC converter upon a temporary drop-out of the AC grid voltage, in accordance with an example.

FIG. 6 is a flowchart illustrating an example of a method for controlling the AC-to-DC converter 100 when a drop-out of the AC grid voltage occurs. The illustrative method is implemented by the processor 120 upon executing software 126.

At step 602, the processor determines whether the AC grid voltage is present or not present. The latter condition indicates the occurrence of a drop-out. If the AC grid voltage is not present, then control moves to step 604 at which the processor 120 causes transistor Q2 and/or transistor Q3 to turn off. Turning off transistors Q2 and/or Q3 helps to avoid a current spike from occurring on the current of inductor L1. Otherwise, a sufficiently large current spike could trip any over-current protection (OCP) that the converter 100 or the system containing the converter may have. If the OCP is tripped, the entire system may be automatically shut down. Upon return of the AC grid voltage, the system may take a substantial period of time to be restarted and re-initialized. By turning off transistors Q2 and/or Q3, a large current spike is prevented.

Before the drop-out occurred, the processor 120 had been generating the virtual AC waveform. In one embodiment, a phase angle from the SPLL is obtained periodically (e.g., once every millisecond) and used to evaluate Eq. (1) above. As indicated at step 606, the processor 120 continues generating the virtual AC waveform. In one embodiment, the processor continues to generate the AC virtual waveform using the most recently obtained phase angle from the SPLL (the last phase angle produced by the SPLL before the AC grid voltage dropped out). At steps 602 and 604, the processor 120 was calculating the virtual AC waveform as well.

At decision step 608, the processor 120 determines whether the AC grid voltage has returned. When the processor 120 determines that the AC grid voltage has returned, the processor 120 begins to again duty cycle transistors Q3 and Q4 as explained above, but, as indicated at step 610, the processor causes transistor Q4 to turn on first before causing transistor Q3 to turn on. This order (turning on transistor Q4 before turning on transistor Q3 as the processor begins to duty cycle the two transistors) helps to prevent a negative current from flowing through the inductor L1 (negative current being in the opposite direction of the arrow for current IL shown in FIG. 1).

At step 612, the processor initiates a timer. The period of time for the timer to count may be preset or programmable. In one example, the timer's count time period is approximately equal to two cycles of the AC grid voltage. For a 50 Hz grid voltage, the timer's count time period is approximately 4 milliseconds. For a 60 Hz grid voltage, the timer's count time period is approximately 3.3 milliseconds. The timer's count period of time may be a little shorter than these values or a little longer than these values. In one example, the range for the timer's count time period is 40 to 50 milliseconds.

While the timer is counting the time period, the processor 120 uses the virtual AC waveform for the voltage control loop. By using the virtual AC waveform, the inductor current IL is much more quickly phase-locked to the newly returned AC grid voltage than would have been the case had the SPLL output signal 451 been used.

The processor 120 determines whether the timer has expired at 616. Until the timer expires, the processor continues to use the virtual AC waveform for the voltage control loop. Upon expiration of the timer, the processor 120 reverts back to using the SPLL output signal 451 for the voltage control loop instead of the virtual AC signal. Control loops back to decision step 602 to detect the next occurrence of a drop-out of the AC grid voltage.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g., NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Unless otherwise stated, "about," "approximately," or "substantially" preceding a value means +/−10 percent of the stated value. Modifications are possible in the described examples, and other examples are possible within the scope of the claims.

Modifications are possible in the described embodiments, and other embodiments are possible, within the scope of the claims.

What is claimed is:

1. A method of converting an alternating current (AC) voltage to a direct current (DC) voltage by an AC-to-DC converter, the method comprising:
produce an AC virtual waveform approximately synchronized to the AC voltage;
detecting a cessation of the AC voltage;
continuing to produce the AC virtual waveform during the cessation of the AC voltage;
detecting a resumption of the AC voltage;
upon detecting the resumption of the AC voltage, applying the AC virtual waveform to a control loop implemented by the AC-to-DC converter for a period of time; and
after the period of time, applying an output of a phase-locked loop to the control loop instead of the AC virtual waveform.

2. The method of claim 1, further including sensing the AC voltage.

3. The method of claim 2, wherein detecting the cessation of the AC voltage includes comparing the AC virtual waveform to the sensed AC voltage.

4. The method of claim 2, wherein detecting the cessation of the AC voltage includes determining that the AC virtual waveform is more than a threshold different than the sensed AC voltage.

5. The method of claim 1, wherein the period of time is in the range of approximately 40 milliseconds to 50 milliseconds.

6. The method of claim 1, wherein producing the AC virtual waveform comprises executing software by a processor.

7. The method of claim 1, wherein producing the AC virtual waveform comprises obtaining a phase angle from the phase-locked loop.

8. The method of claim 1, wherein producing the AC virtual waveform comprises periodically obtaining a phase angle from the phase-locked loop.

9. The method of claim 8, wherein, upon detection of the cessation of the AC voltage, continuing to produce the AC virtual waveform comprises using a most recent phase angle obtained from the phase-locked loop before detecting the cessation of the AC voltage.

10. A non-transitory storage device containing software that, when executed by a processor, causes the processor to:
produce an AC virtual waveform approximately synchronized to an AC voltage;
detect a cessation of the AC voltage;
continue to produce the AC virtual waveform during the cessation of the AC voltage;
detect a resumption of the AC voltage;
upon detecting the resumption of the AC voltage, apply the AC virtual waveform to a control loop implemented by an AC-to-DC converter for a period of time; and
after the period of time, apply an output of a phase-locked loop to the control loop instead of the AC virtual waveform.

11. The non-transitory storage device of claim 10, wherein, when executed by the processor, the software causes the processor to detect the cessation of the AC voltage includes by comparing the AC virtual waveform to a sensed AC voltage.

12. The non-transitory storage device of claim 11, wherein, when executed by the processor, the software causes the processor to detect the cessation of the AC voltage by determining that the AC virtual waveform is more than a threshold different than the sensed AC voltage.

13. The non-transitory storage device of claim 10, wherein, when executed by the processor, the software causes the processor to produce the AC virtual waveform by obtaining a phase angle value from the phase-locked loop.

14. The non-transitory storage device of claim 10, wherein, when executed by the processor, the software causes the processor to produce the AC virtual waveform by periodically obtaining a phase angle from the phase-locked loop.

15. The non-transitory storage device of claim 14, wherein, upon detection of the cessation of the AC voltage, the software causes the processor to produce the AC virtual waveform using the phase angle obtained from the phase-locked loop before detecting the cessation of the AC voltage.

16. A control unit comprising:
a non-transitory storage device containing software;
a processor coupled to the non-transitory storage device, the processor configured to execute the software contained in the non-transitory storage unit, and upon executing the software, the processor is configured to:
produce an AC virtual waveform approximately synchronized to an AC voltage;
detect a cessation of the AC voltage;
continue to produce the AC virtual waveform during the cessation of the AC voltage;
detect a resumption of the AC voltage;
upon detecting the resumption of the AC voltage, apply the AC virtual waveform to a control loop implemented by an alternating current (AC)-to-direct current (DC) converter for a period of time; and
after the period of time, apply an output of a phase-locked loop to the control loop instead of the AC virtual waveform.

17. The control unit of claim 16, wherein the processor is configured to detect the cessation of the AC voltage by determining that the AC virtual waveform is more than a threshold different than a sensed AC voltage.

18. The control unit of claim 16, wherein the processor is configured to produce the AC virtual waveform by periodically obtaining a phase angle from the phase-locked loop.

19. The control unit of claim 16, wherein the period of time is in the range of approximately 40 milliseconds to 50 milliseconds.

* * * * *